United States Patent
Zhu

(10) Patent No.: US 11,613,275 B2
(45) Date of Patent: Mar. 28, 2023

(54) GRAYSCALE-BASED CAMERA PERCEPTION

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 415 days.

(21) Appl. No.: 16/859,113

(22) Filed: Apr. 27, 2020

(65) Prior Publication Data

US 2021/0331704 A1 Oct. 28, 2021

(51) Int. Cl.
| | |
|---|---|
| *B60W 60/00* | (2020.01) |
| *G06T 7/70* | (2017.01) |
| *H04N 1/40* | (2006.01) |
| *G06T 7/90* | (2017.01) |
| *G06K 9/62* | (2022.01) |
| *G06V 10/25* | (2022.01) |
| *G06V 20/56* | (2022.01) |

(52) U.S. Cl.
CPC ....... *B60W 60/0025* (2020.02); *G06K 9/6267* (2013.01); *G06T 7/70* (2017.01); *G06T 7/90* (2017.01); *G06V 10/25* (2022.01); *G06V 20/56* (2022.01); *H04N 1/40012* (2013.01); *B60W 2420/42* (2013.01); *G06T 2207/10024* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2006/0176313 A1* | 8/2006 | Xu | H04N 9/67 345/589 |
| 2012/0081544 A1* | 4/2012 | Wee | G01S 17/894 348/140 |
| 2015/0043815 A1* | 2/2015 | Tan | H04N 19/124 382/166 |
| 2017/0061625 A1* | 3/2017 | Estrada | G06T 15/50 |
| 2018/0189577 A1* | 7/2018 | Yoo | G06T 7/593 |
| 2018/0374360 A1* | 12/2018 | Miao | G05D 1/0088 |
| 2019/0012768 A1* | 1/2019 | Tafazoli Bilandi | G06V 10/764 |
| 2019/0042888 A1* | 2/2019 | Tsutsui | G06V 10/464 |

(Continued)

FOREIGN PATENT DOCUMENTS

WO WO-2021050055 A1 * 3/2021 ......... G06K 9/00362

*Primary Examiner* — Delomia L Gilliard
(74) *Attorney, Agent, or Firm* — Womble Bond Dickinson (US) LLP

(57) ABSTRACT

A method, apparatus, and system for identifying objects based on grayscale images in the operation of an autonomous driving vehicle is disclosed. In one embodiment, one or more first color images are received from a camera mounted at an autonomous driving vehicle (ADV). One or more first grayscale images are generated based on the one or more first color images, which comprises converting each of the one or more first color images into one of the first grayscale images. One or more objects in the one or more first grayscale images are identified based on a pre-trained grayscale perception model. A trajectory for the ADV is planned based at least in part on the identified one or more objects. Control signals are generated to drive the ADV based on the planned trajectory.

20 Claims, 10 Drawing Sheets

(56) References Cited

U.S. PATENT DOCUMENTS

| | | | |
|---|---|---|---|
| 2019/0197778 A1* | 6/2019 | Sachdeva | G06V 20/588 |
| 2019/0318456 A1* | 10/2019 | Chen | G06T 5/009 |
| 2020/0103909 A1* | 4/2020 | Feinson | G05D 1/0251 |
| 2020/0210696 A1* | 7/2020 | Hou | G06V 10/7515 |
| 2021/0201071 A1* | 7/2021 | Liao | G06N 3/08 |
| 2021/0331704 A1* | 10/2021 | Zhu | G06T 7/70 |

* cited by examiner

GRAYSCALE-BASED CAMERA PERCEPTION

TECHNICAL FIELD

Embodiments of the present disclosure relate generally to operating autonomous driving vehicles. More particularly, embodiments of the disclosure relate to identifying objects in the operation of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Object identification based on images captured by onboard cameras is sometimes utilized as part of the perception process in the operation of autonomous driving vehicles. Color images usually contain more information than grayscale images. However, for cameras installed inside the vehicle, the colors in the captured color images can be distorted due to the tinted vehicle window shield or anti-fog or anti-frost vehicle window coating. The color distortion in the captured color images may negatively impact the object identification process that is based on these captured color images.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
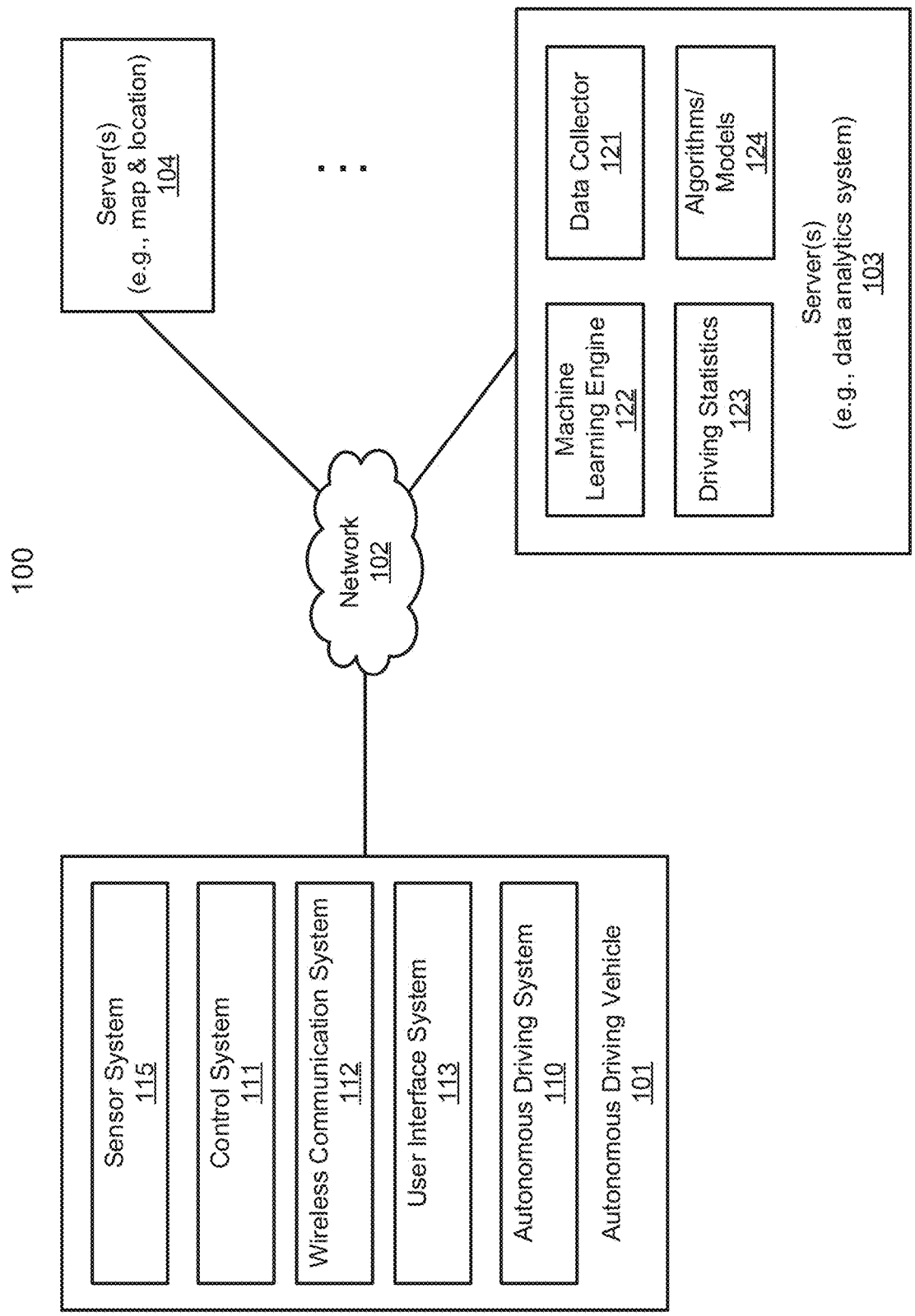
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A method, apparatus, and system for identifying objects based on grayscale images in the operation of an autonomous driving vehicle is disclosed. According to some embodiments, one or more first color images are received from a camera mounted at an autonomous driving vehicle (ADV). One or more first grayscale images are generated based on the one or more first color images, which comprises converting each of the one or more first color images into one of the first grayscale images. One or more objects in the one or more first grayscale images are identified based on a pre-trained grayscale perception model. A trajectory for the ADV is planned based at least in part on the identified one or more objects. Control signals are generated to drive the ADV based on the planned trajectory.

In one embodiment, the pre-trained grayscale perception model has been trained based on a plurality of second color images that are pre-labeled with object labels. In particular, each object label associates a region of an image with an object classification. In one embodiment, the plurality of second color images have been pre-labeled with object labels either manually or automatically based on a model.

In one embodiment, to train the grayscale perception model, the plurality of second color images that are pre-labeled with object labels are received. A plurality of second grayscale images are generated based on the plurality of second color images, which comprises converting each of the plurality of second color images into one of the plurality of second grayscale images. The plurality of second grayscale images are labeled with object labels, which comprises duplicating the object labels associated with the plurality of second color images onto the plurality of second grayscale images respectively. The grayscale perception model is generated based on the plurality of second grayscale images labeled with the object labels, which comprises utilizing the plurality of labeled second grayscale images as training data.

In one embodiment, duplicating the object labels associated with the plurality of second color images onto the plurality of second grayscale images respectively comprises associating each of the object labels on the plurality of second color images with a corresponding one of the plurality of second grayscale images while preserving the image region and object classification information of the object label.

In one embodiment, a same conversion technique is utilized in the conversion of each of the plurality of second color images into one of the plurality of second grayscale images and in the conversion of each of the one or more first color images into one of the first grayscale images. In one embodiment, the one or more first color images are in a color space based on a red, green, and blue (RGB) color model. In one embodiment, converting each of the one or more first color images into one of the first grayscale images comprises performing a perceptual luminance-preserving conversion.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
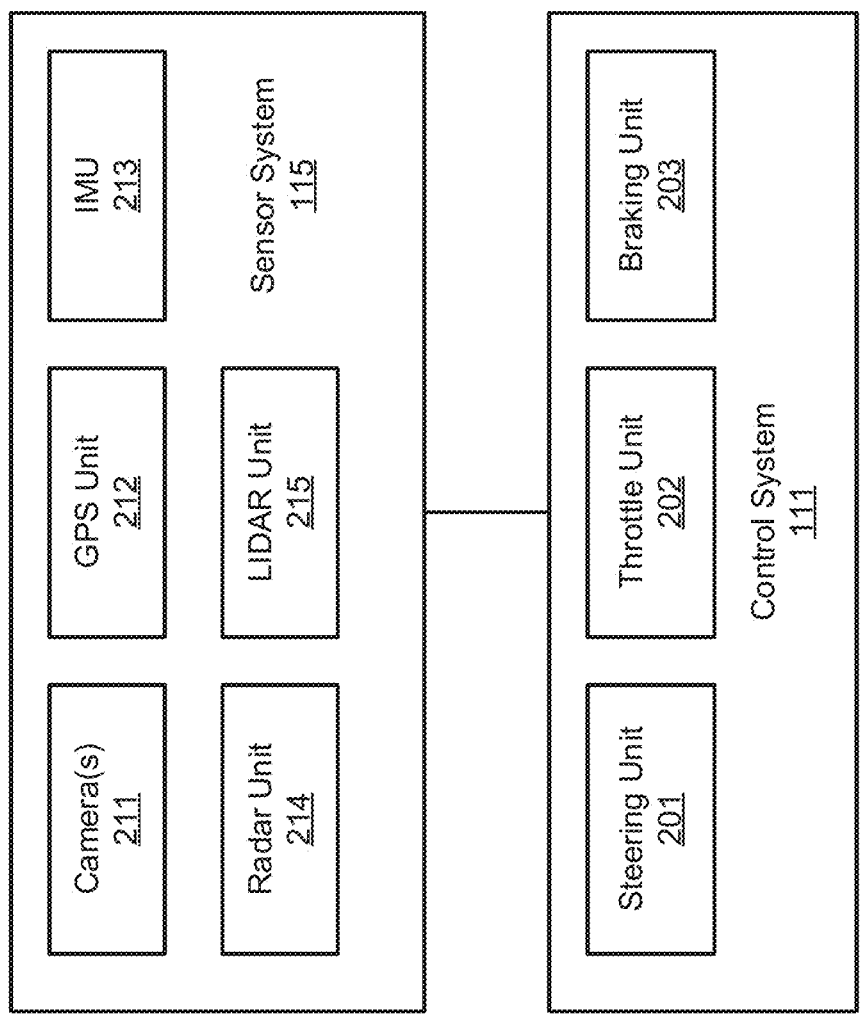
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a trained model that can be utilized for identifying objects in grayscale images. Algorithms 124 can then be uploaded on ADVs to be utilized during autonomous driving in real-time.

Figure 3A:
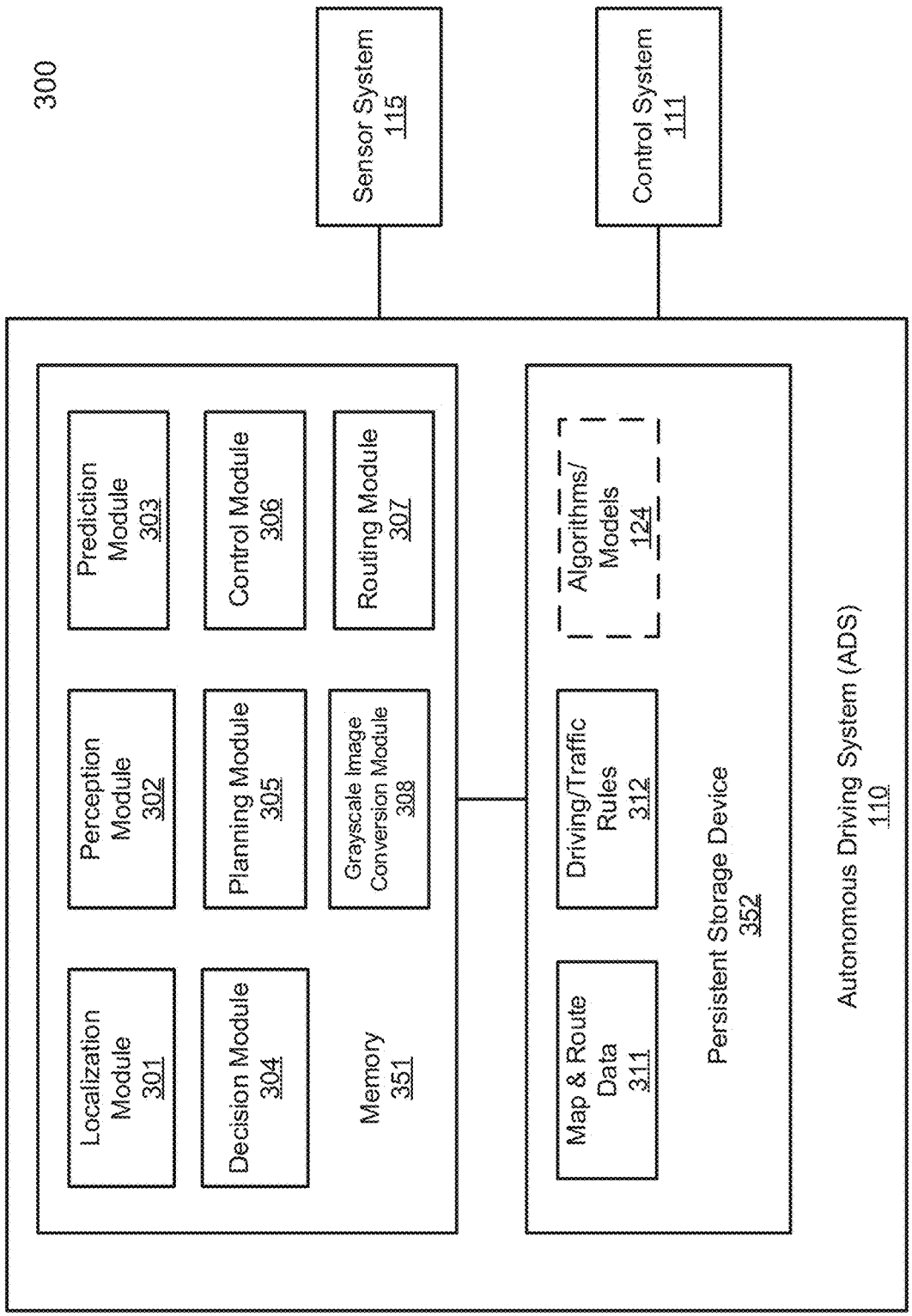
FIGS. 3A-3B are block diagrams illustrating an example of an autonomous driving system used with an autonomous driving vehicle according to one embodiment.
Figure 3B:
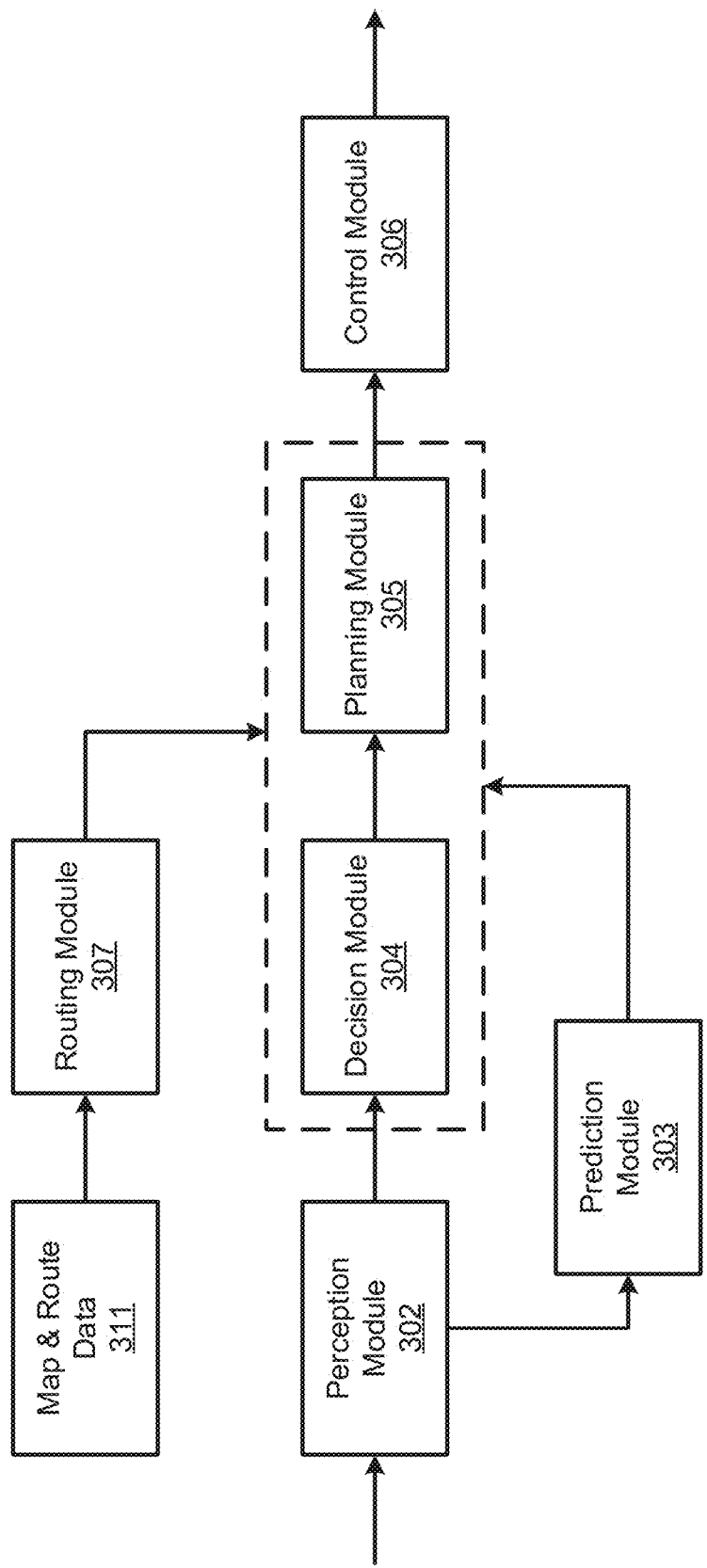

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, grayscale image conversion module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
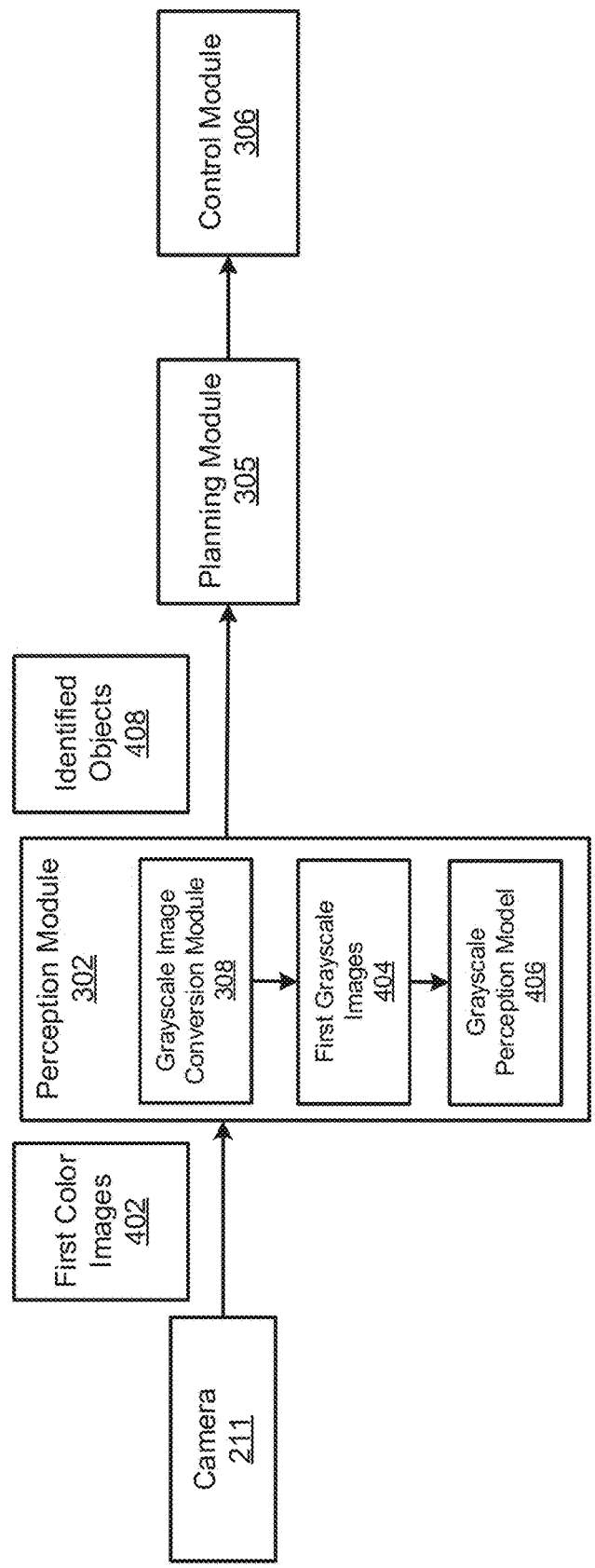
FIG. 4 is a block diagram illustrating various modules utilized in the identification of objects based on grayscale images in the operation of an autonomous driving vehicle according to one embodiment.

Referring to FIG. 4, a block diagram 400 illustrating various modules utilized in the identification of objects based on grayscale images in the operation of an autonomous driving vehicle according to one embodiment is shown. One or more first color images 402 are received at perception module 302 from a camera 211 mounted at an autonomous driving vehicle (ADV) 101. Within the perception module 302, one or more first grayscale images 404 are generated at the grayscale image conversion module 308 based on the one or more first color images 402. The generation of first grayscale images 404 comprises converting each of the one or more first color images 402 into one of the first grayscale images 404 at the grayscale image conversion module 308. The conversion of color images into grayscale images is well known in the art. Well-known techniques, such as a perceptual luminance-preserving conversion may be utilized to convert color images into grayscale images. One or more objects 408 in the one or more first grayscale images 404 are identified at the perception module 302 based on a pre-trained grayscale perception model 406. A trajectory for the ADV 101 is planned at the planning module 305 based at least in part on the identified one or more objects 408. Control signals are generated at the control module 306 to drive the ADV 101 based on the planned trajectory.

In one embodiment, the pre-trained grayscale perception model has been trained based on a plurality of second color images that are pre-labeled with object labels. In particular, each object label associates a region of an image with an object classification. In one embodiment, the plurality of second color images have been pre-labeled with object labels either manually or automatically based on a model.

Figure 5:
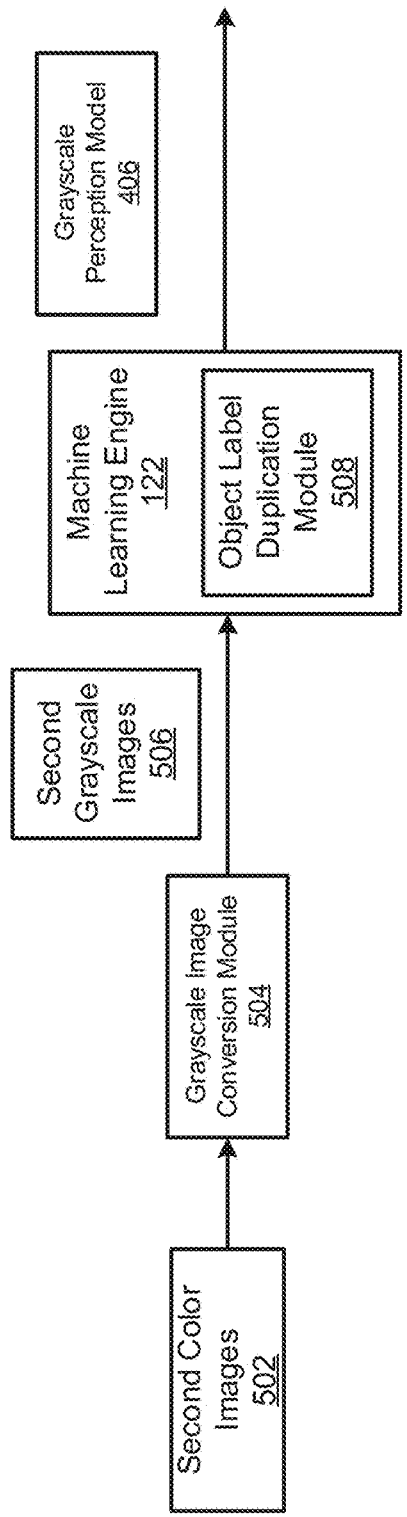
FIG. 5 is a block diagram illustrating various modules utilized in the training of the grayscale perception model according to one embodiment.

Referring to FIG. 5, a block diagram 500 illustrating various modules utilized in the training of the grayscale perception model according to one embodiment is shown. The plurality of second color images 502 that are pre-labeled with object labels are received at the grayscale image conversion module 504. The grayscale image conversion module 504 may be executed at server 103 and is similar to the grayscale image conversion module 308. A plurality of second grayscale images 506 are generated by the grayscale image conversion module 504 based on the plurality of second color images 502. The generation of the plurality of second grayscale images 506 comprises converting each of the plurality of second color images 502 into one of the plurality of second grayscale images 506. The conversion of color images into grayscale images is well known in the art. Well-known techniques, such as a perceptual luminance-preserving conversion may be utilized to convert color images into grayscale images. Within the machine learning engine 122, the plurality of second grayscale images 506 are labeled with object labels at the object label duplication module 508. Labeling the plurality of second grayscale images 506 comprises duplicating the object labels associated with the plurality of second color images 502 onto the plurality of second grayscale images 506 respectively. In particular, the object label duplication module 508 associates each of the object labels on the plurality of second color images 502 with a corresponding one of the plurality of second grayscale images 506 while preserving the image region and object classification information of the object label. The grayscale perception model 406 is generated at the machine learning engine 122 based on the plurality of second grayscale images 506 labeled with the object labels. The generation of the grayscale perception model 406 comprises utilizing the plurality of labeled second grayscale images 506 as training data.

In one embodiment, a same conversion technique is utilized in the conversion of each of the plurality of second color images into one of the plurality of second grayscale images and in the conversion of each of the one or more first color images into one of the first grayscale images. For example, the conversion technique may comprise a perceptual luminance-preserving conversion.

Figure 6:
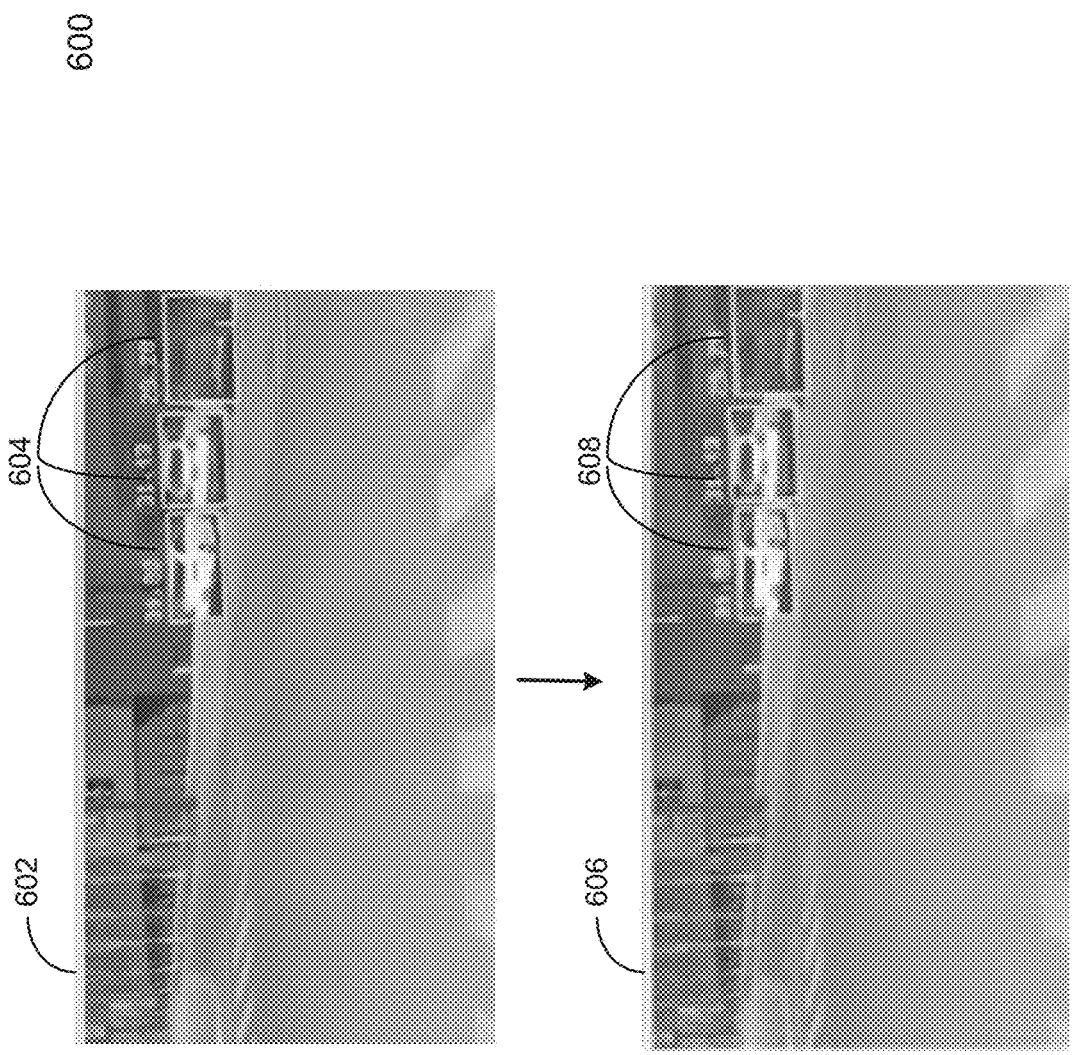
FIG. 6 is a diagram illustrating an example second color image and an example second grayscale image according to one embodiment.

Referring to FIG. 6, a diagram 600 illustrating an example second color image and an example second grayscale image according to one embodiment is shown. It should be appreciated that it is only due to technical limitations associated with patent applications that the color image 602 appears to be in grayscale in the present disclosure. The second color image 602 has been pre-labeled with 3 object labels 604. Each object label 604 associates a region of the second color image 602 with an object classification. In this example, all object labels 604 include a "vehicle" classification. Other possible object classifications may include a pedestrian, a bicycle, a plant, a traffic light, etc. The object labels 604 may have been generated either manually or automatically based on a model. Therefore, the grayscale image conversion module 504 may convert the second color image 602 into a second grayscale image 606. Then, the object label duplication module 508 may duplicate the object labels 604 on the second color image 602 onto the second grayscale image 606. The duplicated object labels 608 preserve the image region and object classification information of the object labels 604. In other words, the object labels 608 associate the corresponding regions in the second grayscale image 606 with the same "vehicle" classification. Thereafter, the second grayscale image 606 and the associated object labels 608, together with other similar second grayscale images and associated object labels, may be utilized as training data in the generation of the grayscale perception model 406 at the machine learning engine 122.

Figure 7:
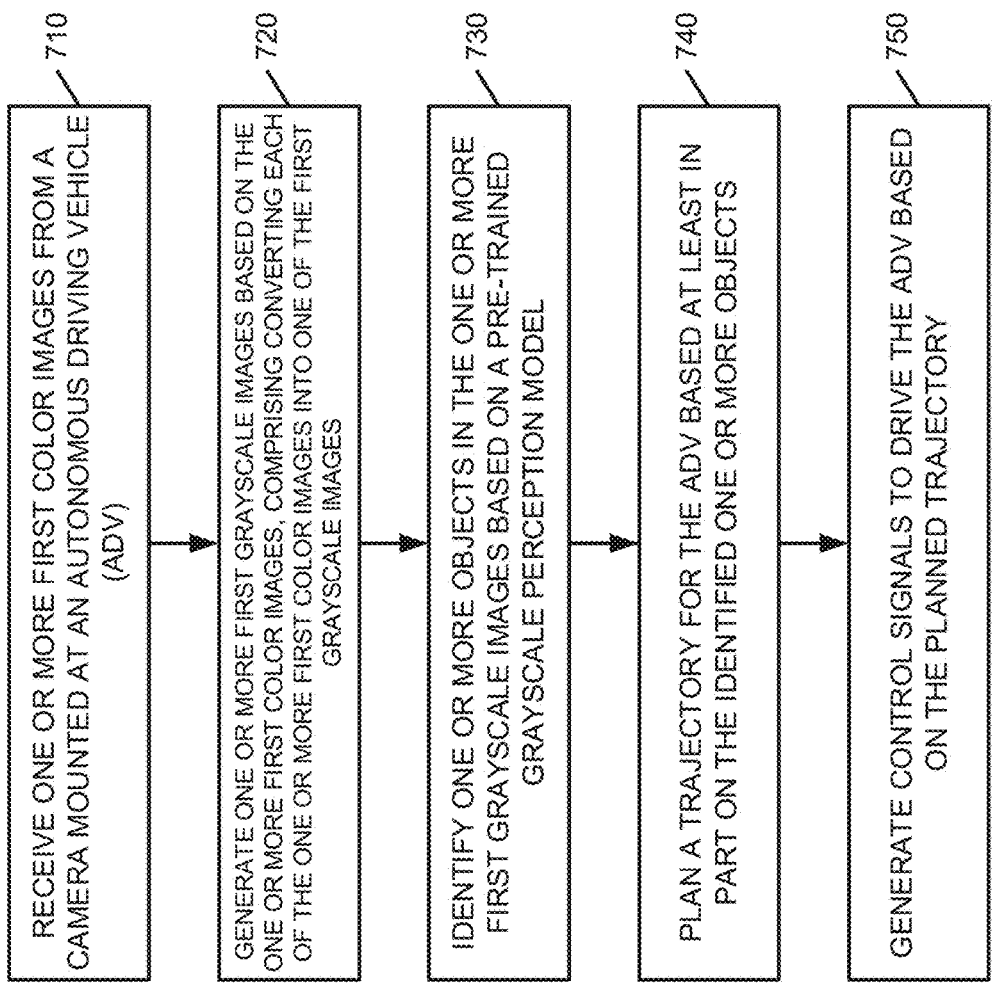
FIG. 7 is a flowchart illustrating an example method for identifying objects based on grayscale images in the operation of an autonomous driving vehicle according to one embodiment.

Referring to FIG. 7, a flowchart illustrating an example method 700 for identifying objects based on grayscale images in the operation of an autonomous driving vehicle according to one embodiment is shown. The process 700 may be implemented with appropriate hardware, software, or a combination thereof. At block 710, one or more first color images are received from a camera mounted at an autonomous driving vehicle (ADV). At block 720, one or more first grayscale images are generated based on the one or more first color images. The generation of first grayscale images comprises converting each of the one or more first color images into one of the first grayscale images. The conversion of color images into grayscale images is well known in the art. Well-known techniques, such as a perceptual luminance-preserving conversion may be utilized to convert color images into grayscale images. At block 730, one or more objects in the one or more first grayscale images are identified based on a pre-trained grayscale perception model. At block 740, a trajectory for the ADV is planned based at least in part on the identified one or more objects. At block 750, control signals are generated to drive the ADV based on the planned trajectory.

Figure 8:
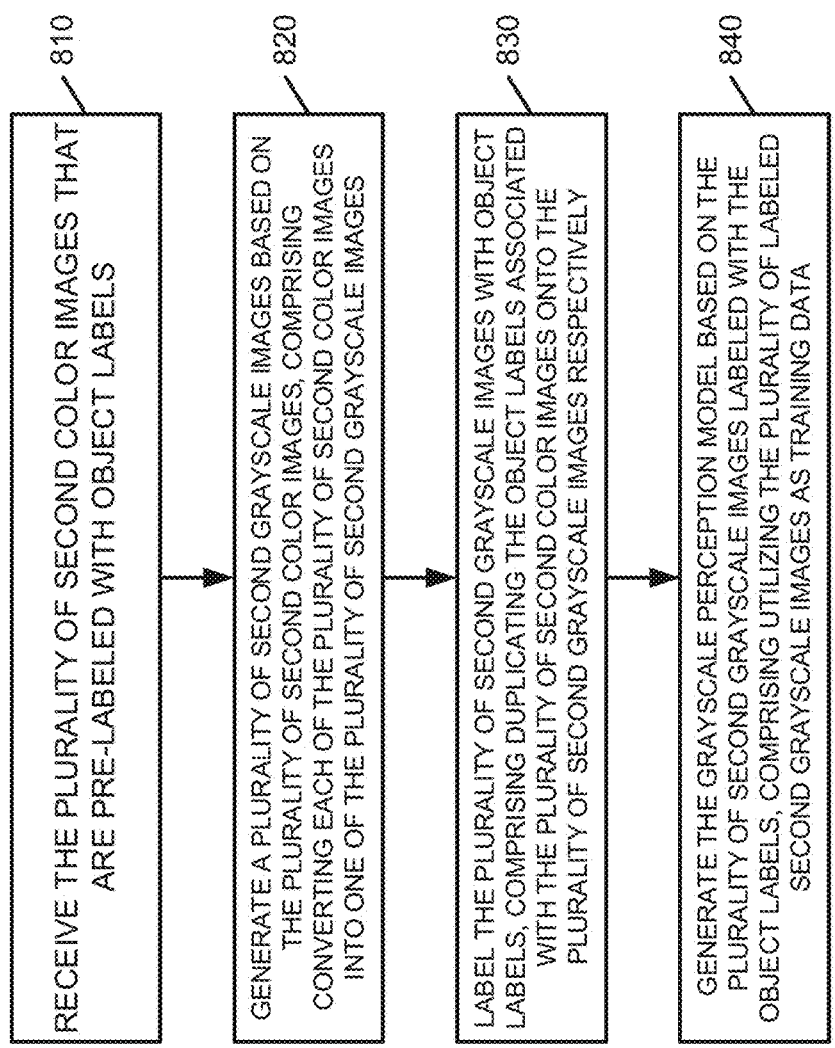
FIG. 8 is a flowchart illustrating an example method for training the grayscale perception model according to one embodiment.

Referring to FIG. 8, a flowchart illustrating an example method 800 for training the grayscale perception model according to one embodiment is shown. The process 800 may be implemented with appropriate hardware, software, or a combination thereof. At block 810, the plurality of second color images that are pre-labeled with object labels are received. At block 820, a plurality of second grayscale images are generated based on the plurality of second color images. The generation of the plurality of second grayscale images comprises converting each of the plurality of second color images into one of the plurality of second grayscale images. The conversion of color images into grayscale images is well known in the art. Well-known techniques, such as a perceptual luminance-preserving conversion may be utilized to convert color images into grayscale images. At block 830, the plurality of second grayscale images are labeled with object labels, which comprises duplicating the object labels associated with the plurality of second color images onto the plurality of second grayscale images respectively. In particular, each of the object labels on the plurality of second color images is associated with a corresponding one of the plurality of second grayscale images while the image region and object classification information of the object label is preserved. At block 840, the grayscale perception model is generated based on the plurality of second grayscale images labeled with the object labels. The generation of the grayscale perception model comprises utilizing the plurality of labeled second grayscale images as training data.

In one embodiment, a same conversion technique is utilized in the conversion of each of the plurality of second color images into one of the plurality of second grayscale images and in the conversion of each of the one or more first color images into one of the first grayscale images. For example, the conversion technique may comprise a perceptual luminance-preserving conversion.

Figure 9:
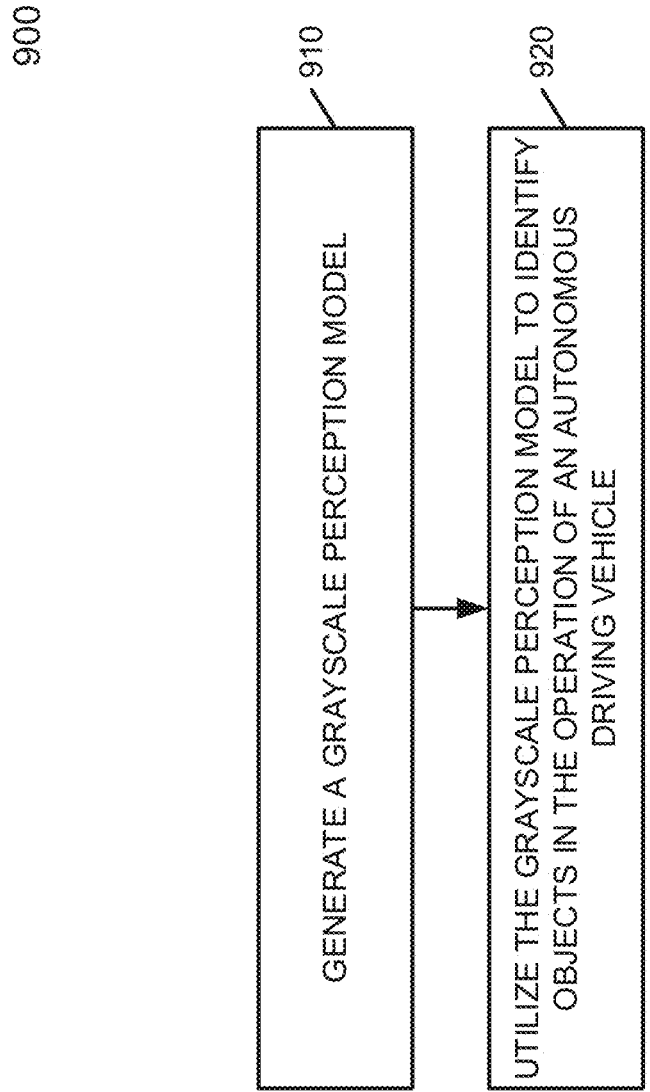
FIG. 9 is a flowchart illustrating an example method for generating and utilizing a grayscale perception model according to one embodiment.

Referring to FIG. 9, a flowchart illustrating an example method 900 for generating and utilizing a grayscale perception model according to one embodiment is shown. The process 900 may be implemented with appropriate hardware, software, or a combination thereof. At block 910, a grayscale perception model may be generated. The grayscale perception model may be generated based on well-known machine learning techniques. The training data utilized in the generation of the grayscale perception model may comprise second grayscale images that are labeled with object labels. The labeled second grayscale images may be derived from second color images that are pre-labeled with object labels. At block 920, the grayscale perception model may be utilized to identify objects in the operation of an autonomous driving vehicle. Objects may be identified in the first grayscale images based on the grayscale perception model. The first grayscale images may be derived from live first color images that are captured by a camera installed on the autonomous driving vehicle.

Therefore, with embodiments described herein, grayscale images rather than color images are directly utilized in the object identification process in the operation of an autonomous driving vehicle. This helps improve the object identification process by reducing or eliminating the potential negative impact to the object identification process caused by distorted colors in the live color images captured by the onboard camera. The color distortion may arise when, for example, the camera is installed inside the vehicle, and there are tinted vehicle window shields or coating. As a result, and in particular, traffic light detection, plant detection, and pedestrian detection, etc., which otherwise would have at least partially relied on certain presumptions about color, can be improved. The embodiments may also be helpful during dark or cloudy weather conditions as the color information in the captured color images is of lower quality under such conditions.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving one or more first color images from a camera mounted at an autonomous driving vehicle (ADV);
   generating one or more first grayscale images based on the one or more first color images, including converting each of the one or more first color images into one of the first grayscale images;
   receiving a plurality of second color images that are pre-labeled with object labels;
   generating a pre-trained grayscale perception model based on a plurality of second grayscale images labeled with object labels duplicated from the plurality of second color images;
   identifying one or more objects in the one or more first grayscale images using the pre-trained grayscale perception model;
   planning a trajectory for the ADV based at least in part on the identified one or more objects; and
   generating control signals to drive the ADV based on the planned trajectory.

2. The method of claim 1, wherein each object label associates a region of an image with an object classification.

3. The method of claim 2, wherein the plurality of second color images have been pre-labeled with object labels either manually or automatically based on a model.

4. The method of claim 2, wherein generating the pre-trained grayscale perception model comprises:
   generating the plurality of second grayscale images based on the plurality of second color images, including converting each of the plurality of second color images into one of the plurality of second grayscale images;
   labeling the plurality of second grayscale images with object labels, including duplicating the object labels associated with the plurality of second color images onto the plurality of second grayscale images respectively; and
   generating the pre-trained grayscale perception model based on the plurality of second grayscale images labeled with the object labels, including utilizing the plurality of labeled second grayscale images as training data.

5. The method of claim 4, wherein duplicating the object labels associated with the plurality of second color images onto the plurality of second grayscale images respectively comprises associating each of the object labels on the plurality of second color images with a corresponding one of the plurality of second grayscale images while preserving the region of the image and object classification information of the object label.

6. The method of claim 4, wherein a same conversion technique is utilized in the conversion of each of the plurality of second color images into one of the plurality of second grayscale images and in the conversion of each of the one or more first color images into one of the first grayscale images.

7. The method of claim 1, wherein the one or more first color images are in a color space based on a red, green, and blue (RGB) color model.

8. The method of claim 1, wherein converting each of the one or more first color images into one of the first grayscale images comprises performing a perceptual luminance-preserving conversion.

9. A non-transitory machine-readable medium having instructions stored therein, which when executed by a processor, cause the processor to perform operations, the operations comprising:
receiving one or more first color images from a camera mounted at an autonomous driving vehicle (ADV);
generating one or more first grayscale images based on the one or more first color images, including converting each of the one or more first color images into one of the first grayscale images;
receiving a plurality of second color images that are pre-labeled with object labels;
generating a pre-trained grayscale perception model based on a plurality of second grayscale images labeled with object labels duplicated from the plurality of second color images;
identifying one or more objects in the one or more first grayscale images using the pre-trained grayscale perception model;
planning a trajectory for the ADV based at least in part on the identified one or more objects; and
generating control signals to drive the ADV based on the planned trajectory.

10. The non-transitory machine-readable medium of claim 9, wherein each object label associates a region of an image with an object classification.

11. The non-transitory machine-readable medium of claim 10, wherein the plurality of second color images have been pre-labeled with object labels either manually or automatically based on a model.

12. The non-transitory machine-readable medium of claim 10, wherein generating the pre-trained grayscale perception model comprises:
generating the plurality of second grayscale images based on the plurality of second color images, including converting each of the plurality of second color images into one of the plurality of second grayscale images;
labeling the plurality of second grayscale images with object labels, including duplicating the object labels associated with the plurality of second color images onto the plurality of second grayscale images respectively; and
generating the pre-trained grayscale perception model based on the plurality of second grayscale images labeled with the object labels, including utilizing the plurality of labeled second grayscale images as training data.

13. The non-transitory machine-readable medium of claim 12, wherein duplicating the object labels associated with the plurality of second color images onto the plurality of second grayscale images respectively comprises associating each of the object labels on the plurality of second color images with a corresponding one of the plurality of second grayscale images while preserving the region of the image and object classification information of the object label.

14. The non-transitory machine-readable medium of claim 12, wherein a same conversion technique is utilized in the conversion of each of the plurality of second color images into one of the plurality of second grayscale images and in the conversion of each of the one or more first color images into one of the first grayscale images.

15. The non-transitory machine-readable medium of claim 9, wherein the one or more first color images are in a color space based on a red, green, and blue (RGB) color model.

16. The non-transitory machine-readable medium of claim 9, wherein converting each of the one or more first color images into one of the first grayscale images comprises performing a perceptual luminance-preserving conversion.

17. A data processing system, comprising:
a processor; and
a memory coupled to the processor to store instructions, which when executed by the processor, cause the processor to perform operations, the operations including
receiving one or more first color images from a camera mounted at an autonomous driving vehicle (ADV),
generating one or more first grayscale images based on the one or more first color images, including converting each of the one or more first color images into one of the first grayscale images,
receiving a plurality of second color images that are pre-labeled with object labels,
generating a pre-trained grayscale perception model based on a plurality of second grayscale images labeled with object labels duplicated from the plurality of second color images,
identifying one or more objects in the one or more first grayscale images using the pre-trained grayscale perception model,
planning a trajectory for the ADV based at least in part on the identified one or more objects, and
generating control signals to drive the ADV based on the planned trajectory.

18. The data processing system of claim 17, wherein each object label associates a region of an image with an object classification.

19. The data processing system of claim 18, wherein the plurality of second color images have been pre-labeled with object labels either manually or automatically based on a model.

20. The data processing system of claim 18, wherein generating the pre-trained grayscale perception model comprises:
generating the plurality of second grayscale images based on the plurality of second color images, including converting each of the plurality of second color images into one of the plurality of second grayscale images;
labeling the plurality of second grayscale images with object labels, including duplicating the object labels associated with the plurality of second color images onto the plurality of second grayscale images respectively; and
generating the pre-trained grayscale perception model based on the plurality of second grayscale images labeled with the object labels, including utilizing the plurality of labeled second grayscale images as training data.

* * * * *